United States Patent [19]
Nelson et al.

[11] 3,765,176
[45] Oct. 16, 1973

[54] AUTOMATIC RELIGHT
[75] Inventors: Robert E. Nelson; Oran A. Watts, III, both of Indianapolis, Ind.
[73] Assignee: General Motors Corporation, Detroit, Mich.
[22] Filed: Feb. 22, 1972
[21] Appl. No.: 227,811

[52] U.S. Cl. ................................................. 60/223
[51] Int. Cl. ............................................. F02k 3/00
[58] Field of Search ........................... 60/223, 39.14

[56] References Cited
UNITED STATES PATENTS
3,279,169  10/1966  Bayard .............................. 60/39.14
3,470,691  10/1969  Smith ............................... 60/39.14
3,600,887  8/1971   Gault ............................... 60/39.14

Primary Examiner—Clarence R. Gordon
Attorney—Paul Fitzpatrick et al.

[57] ABSTRACT

A system for automatically turning on the ignition of a gas turbine engine upon flameout, particularly applicable to a helicopter installation. The system responds to the relation of rate of decay of compressor discharge pressure (CDP) to the level of CDP before flameout. The system discriminates against CDP transients due to compressor noise, and those caused by decreasing the engine power level, by establishing a curve of Δ CDP against CDP above which the magnitude of Δ CDP is sufficient to indicate a flameout. The CDP signal generated by a resistance bridge is fed through an operational amplifier to curve-shaping and differentiating circuits. The outputs of the shaping and differentiating circuits are compared in a second operational amplifier which energizes its output in response to an excess of Δ CDP over the established curve. The resulting signal is delayed for approximately 5 milliseconds to discriminate against short-lived transients and then transmitted to a delay circuit. The delay circuit delays ignition to allow for decay of torque transients following the flameout with the engine connected to the mass-elastic load. After this delay, the ignition of the engine is kept energized for several seconds by a timing circuit energized by the delay circuit. Logic circuits are provided to control sequencing and operation, including resetting the delay and timing circuits upon occurrence of a flameout under certain conditions.

10 Claims, 6 Drawing Figures

AUTOMATIC RELIGHT

The invention described and claimed herein was made in the course of work under a contract with the Department of Defense.

INTRODUCTION

Our invention relates to automatic reignition circuits for gas turbine engines and is particularly adapted to relight a gas turbine engine powering a helicopter.

When a helicopter is airborne, loss of power to drive the rotors may be a quite critical condition. Sudden extinguishing of the flame in a gas turbine engine in such service may be the result of various conditions such as ingestion into the engine intake of slugs of water, ice, or oxygen-poor gas, excessively lean fuel-air ratios during engine deceleration, or slugs of water in the engine fuel, for example.

In the event of such flameout, it is most desirable to reignite the combustion apparatus before the engine has lost so much speed that it will not be self-cranking by rotor inertia if combustion is resumed.

Various relatively unsuccessful arrangements for detecting flameout of a gas turbine engine have been proposed. Upon a flameout, the gas generator of the engine, and ordinarily the power turbine, rapidly lose speed; the temperature of the fluid entering the turbine drops sharply; and, as the gas generator slows down, the compressor discharge pressure falls off.

We have concluded that compressor discharge pressure (hereafter CDP or $P_C$) provides the best signal for detecting engine flameout. The use of this parameter, however, involves considerable complications because of the fact that the aircraft gas turbine is operated at varying power levels and at varying barometric pressure; thus the compressor discharge pressure is a widely variable quantity. In engine operation at, for example, full power, the aircraft pilot may chop the throttle, causing a substantial rate of decrease of compressor discharge pressure in normal operation of the engine. Also, as in all such machinery, there are minor but sometimes sharp variations in compressor discharge pressure which we may call compressor noise.

Thus, to develop a suitable automatic reignition system for an aircraft gas turbine, it is necessary to accommodate to varying altitudes and to provide means to distinguish a change in CDP caused by a flameout from one caused by cutting the engine power and from minor transients.

Another factor of interest in connection with the particular installation in a helicopter lies in the fact that, upon flameout of the engine, the mass-elastic system comprising the power turbine, the reduction gearbox, the lifting rotor, and the tail rotor, if any, of the aircraft enters into oscillations which gradually decay. During such torque oscillations, resumption of power by the engine may cause an overload of some part of the mechanical system driven by the engine and thus a failure. For this reason, our system includes means to delay reignition to allow these transients to decay to a level at which reignition is safe.

The apparatus which constitutes the preferred embodiment of our invention also includes other significant features which will be made clear by the following detailed description.

The principal objects of our invention are to provide a reliable system for reigniting a gas turbine engine upon flameout; to provide such a system which accurately discriminates between transients which may occur in normal operation of the engine and those which are indicative of a flameout; to provide a gas turbine reignition system responsive to a CDP signal; to provide a reignition system which delays reignition for sufficient time for decay of transients incident to flameout; and, in general, to provide a reignition system improving the safety and utility of gas turbine powered aircraft such as helicopters.

The nature of our invention and its advantages will be clear to those skilled in the art from the succeeding detailed description of its preferred embodiment and the accompanying drawings.

ENVIRONMENT OF THE INVENTION

Figure 1:
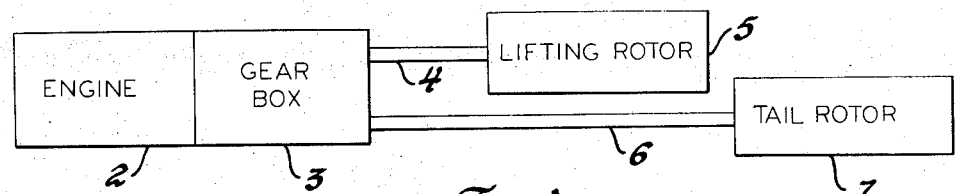
FIG. 1 is a schematic diagram of a helicopter power installation.

Referring first to FIG. 1, a gas turbine engine 2 may be the well-known Allison T63 engine or other suitable gas turbine engine. The Allison engine comprises a compressor, combustion apparatus, and a turbine driving the compressor, these constituting a gas generator, and a free or power turbine driven by the exhaust of the gas generator which provides the engine power output. The engine drives, through a reduction gearbox 3 and shaft 4, the lifting rotor 5 of the aircraft. It also drives through a shaft 6 the tail rotor 7 of the aircraft in the type of installation described. There is no need to go into details of structure of such well-known installations, examples being the OH 6A and OH 58A helicopters.

Figure 2:
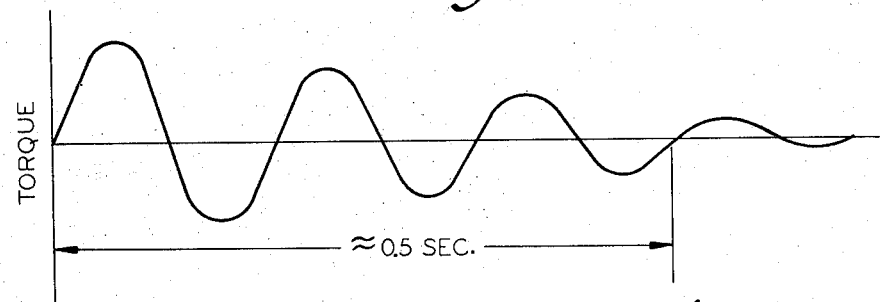
FIG. 2 is a graph illustrating the decay of torque transients in the gearing and shafting of such a power plant upon flameout of the engine.

In normal operation, the engine constantly drives the lifting and tail rotors and the power output of the engine may be varied as desired. If the flame in the combustor is extinguished, there is a very rapid loss of torque from the engine resulting in torsional oscillations in the mass-elastic system comprising the gearbox, shafts, and rotors. FIG. 2 illustrates generally the nature of such oscillations in a typical case, the oscillations being generally of a sinusoidal nature with exponential decay in amplitude. In the particular case being described, the oscillations are damped to an insignificant level in about one-half second as indicated.

Figures 3, 4:
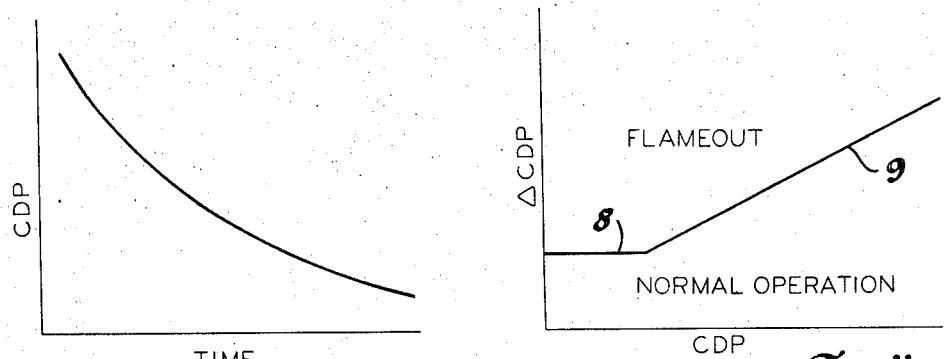
FIG. 3 is a curve illustrating decay of CDP with time upon flameout of an engine.
FIG. 4 is a plot of rate of change of CDP ($\Delta$ CDP) against CPD, illustrating the demarcations between such levels as may occur in normal operation and those which are indicative of flameout.

Upon flameout, the gas generator turbine and compressor rapidly decelerate in response to the gas loads acting against the rotational inertia of the rotating system. Deceleration is approximately proportional to the square of rotational speed. The discharge pressure of the compressor will decay approximately as indicated in FIG. 3, where the ordinate is CDP and the abscissa is time. The actual rate of decay of CDP depends upon its amplitude at the time of flameout and, to some extent, upon ambient atmospheric pressure. The absolute level of CDP will vary with ambient atmospheric pressure for any given speed of rotation of the compressor, and it also varies with the power level of the engine, which is varied by changing the rotational speed of the gas generator. Δ CDP upon flameout is approximately proportional to the square of CDP.

As a result, there is no particular level of CDP or of rate of change of CDP that can be used for indicating flameout of the engine to the required degree of accuracy. A reason for this, apart from the differences of level of CDP and its derivative, lies in the fact that reignition must be initiated quickly, but not too quickly. Thus, for instance, it is entirely unsuitable to initiate reignition immediately upon a sharp drop in CDP or on the basis of a very low level of CDP.

Our invention uses the rate of change of CDP relative to CDP as the signal to initiate reignition. The basis for this discrimination is illustrated in FIG. 4 where Δ CDP is plotted against CDP. The area marked "Normal Operation" below the curve 8,9 represents the range of Δ CDP as a function of CDP which may be encountered in normal operation. Obviously, as shown by the slope of the curve in FIG. 3, the higher the compressor discharge pressure, the greater its rate of change upon flameout, which is indicated by the rising portion 9 of the curve. The lefthand portion 8 of the curve represents a constant Δ CDP value below which the system becomes unduly sensitive. It will be appreciated that the line of demarcation between the two conditions is not so much a line as a band, but by testing the operation of a particular model of engine, it is possible to draw a curve such as that indicated by 8,9 in FIG. 4 above which the decay of compressor discharge pressure is almost surely an indication of a flameout and in which the curve is low enough that a flameout will surely cause a point representing the relation of Δ CDP to CDP to be above the curve.

As indicated in the introduction to this specification, it is not sufficient merely to sense the existence of a flameout. In practice, there are other requirements which are highly desirable from the standpoint of consistent operation under in service conditions.

GENERAL DESCRIPTION

Figure 5:
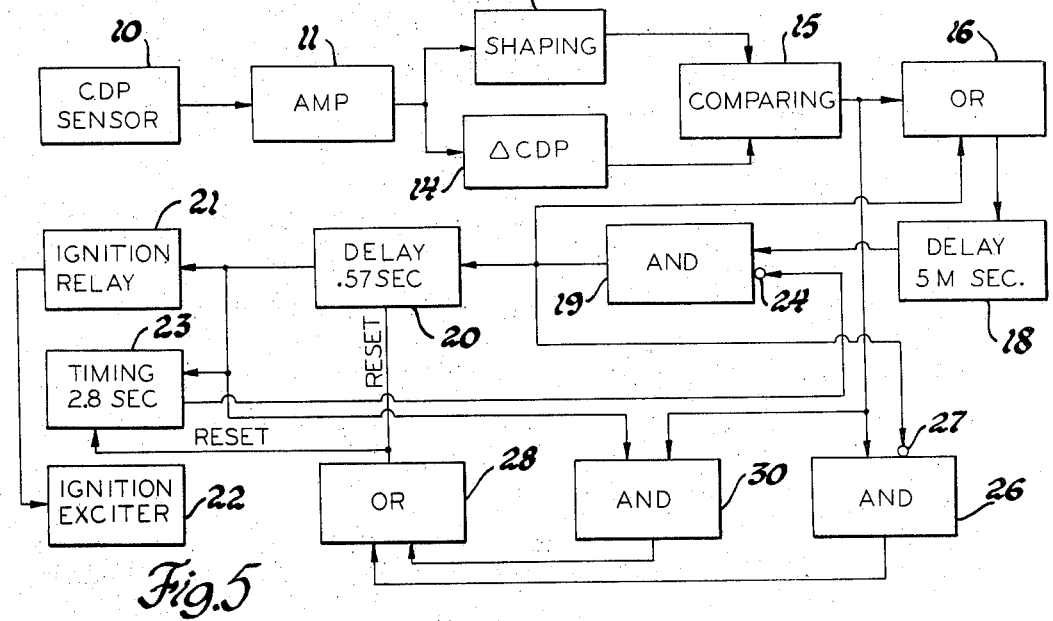
FIG. 5 is a schematic or block diagram of the preferred embodiment of our system.

The nature of the system which we have devised to handle this problem is indicated more fully in FIG. 5. As indicated there, the input to the system comes from a pressure transducer or sensor 10 which develops an emf proportional to CDP. This emf is fed into an operational amplifier 11 to provide an output proportional to the input. This output is applied to a shaping circuit 12 which generates an output voltage based on the input voltage and conforming to the curve 8,9 of FIG. 4; that is, below some value of CDP the output of the shaping circuit is fixed, and above that value it is approximately proportional to CDP. The amplified CDP signal is also fed into the Δ CDP or differentiating circuit 14 which provides an output substantially proportional to the rate of change or derivative of CDP. The actual value of this derivative is compared with the threshold value generated in the shaping circuit 12 in a comparing operational amplifier 15. When the derivative is greater than the determined threshold, the comparing circuit provides an output; otherwise, its output is zero.

This output indicating the occurrence of a flameout is fed to an OR gate 16, serving as a latch, which provides an output if either of its inputs is energized. When the OR gate receives the signal from the comparing circuit 15, it provides an output to momentary delay means 18 which, in the specific embodiment, requires about 5 milliseconds of energization to transmit a signal. This momentary delay circuit acts as a discriminator against ephemeral transients which are not indicative of a flameout, such as compressor noise. After the momentary delay, the signal is transmitted through the delay device 18 to an AND gate 19 forming part of the logic or controlling portions of the system. Normally the other input of the AND gate is energized, as will be explained, so the AND gate provides an output signal. This signal is fed to the OR gate 16 to latch the OR gate on so that it remains turned on when the signal in the comparing circuit disappears.

The output of the AND gate is used to energize the ignition circuit of the engine. However, for reasons pointed out above, in this particular installation, a delay of over a half-second before the ignition is energized is needed for decay of transients. Therefore, the AND circuit 19 energizes a delay circuit 20 which holds up transmission of the signal for 0.57 seconds, in this particular embodiment. After this time lapse, the ignition relay 21 is energized to energize the ignition exciter 22 and thus reignite the engine combustor.

The delay circuit 20 also energizes a timing circuit 23, the main purpose of which is to maintain the ignition energized for 2.8 seconds in this particular case. The value of 2.8 seconds represents a time interval after which, if the engine has flamed out and is not reignited, it will no longer be capable of self starting because of loss of gas generator speed. After the 2.8 seconds holding time, circuit 23 provides a signal to the AND gate 19 through an inverting circuit 24. Before the expiration of the 2.8 second holding period, with no signal at the inverter 24, it provides a positive input to the AND gate 19 so that the condition of two inputs, referred to above, is satisfied. Thus, upon initial flameout, the AND gate receives the two input signals to cause it to transmit a signal through the delay circuit 20 to the ignition circuit 21 and timing circuit 23; and, upon the expiration of the 2.8 seconds the timing circuit extinguishes one input to the AND gate, thereby deenergizing the ignition. This also terminates the signal from the AND gate 19 to the OR gate 16 so that until there is a new flameout signal the circuit remains turned off.

The remainder of the system includes means to assure that the timing circuits 20 and 23 are reset by the first signal from the comparing amplifier 15, and are reset only after expiration of the initial 0.57 second delay if there is a repeated flameout signal during this interval. It will be noted that the comparing circuit 15 provides a flameout signal to a second AND gate 26; the AND gate also has an input from the first AND gate 19 through an inverting circuit 27. Thus, assuming the system is in normal operation and the first flameout signal comes from the comparing amplifier 15, the AND gate 26 will have two positive inputs, because at this point the AND gate 19 is not energized; therefore, the AND gate 26 provides an output to an OR gate 28. This input energizes the OR gate 28 to transmit a reset signal to the delay circuit 20 and the timing circuit 23. As will be shown, this specifically involves discharge of timing condensers to make sure that the circuits 20 and 23 start from their proper datums. After the momentary delay in 16 and the turning on of the AND gate 19, the input through 27 to the second AND gate 26 becomes zero and its signal to the OR gate 28 is terminated.

The comparing circuit 15 also provides a signal to a third AND gate 30 when a flameout is detected. AND gate 30 receives its second input from the output of holding circuit 20 which is energized only when the ignition is turned on. Thus, when the ignition is turned on, if the comparing circuit signals a second flameout, both inputs to the AND gate 30 are energized and it provides a signal to OR gate 28 causing a resetting of both timers and deenergization of the ignition. The result is reestablishment of the 0.57 delay period for reenergization of the ignition after the second flameout signal. This resetting cannot occur during the 0.57 delay period prior to turning on the ignition.

From the foregoing, it will be seen that we have devised a system which is capable of discriminating between flameouts and other transients, which delays the initiation of ignition to allow for decay of mechanical oscillations in the rotor drive system, which maintains the ignition energized for a suitable time, and which initiates a new cycle if a second flameout occurs after reignition and before the end of the timing period for normal operation of the ignition.

Figure 6:
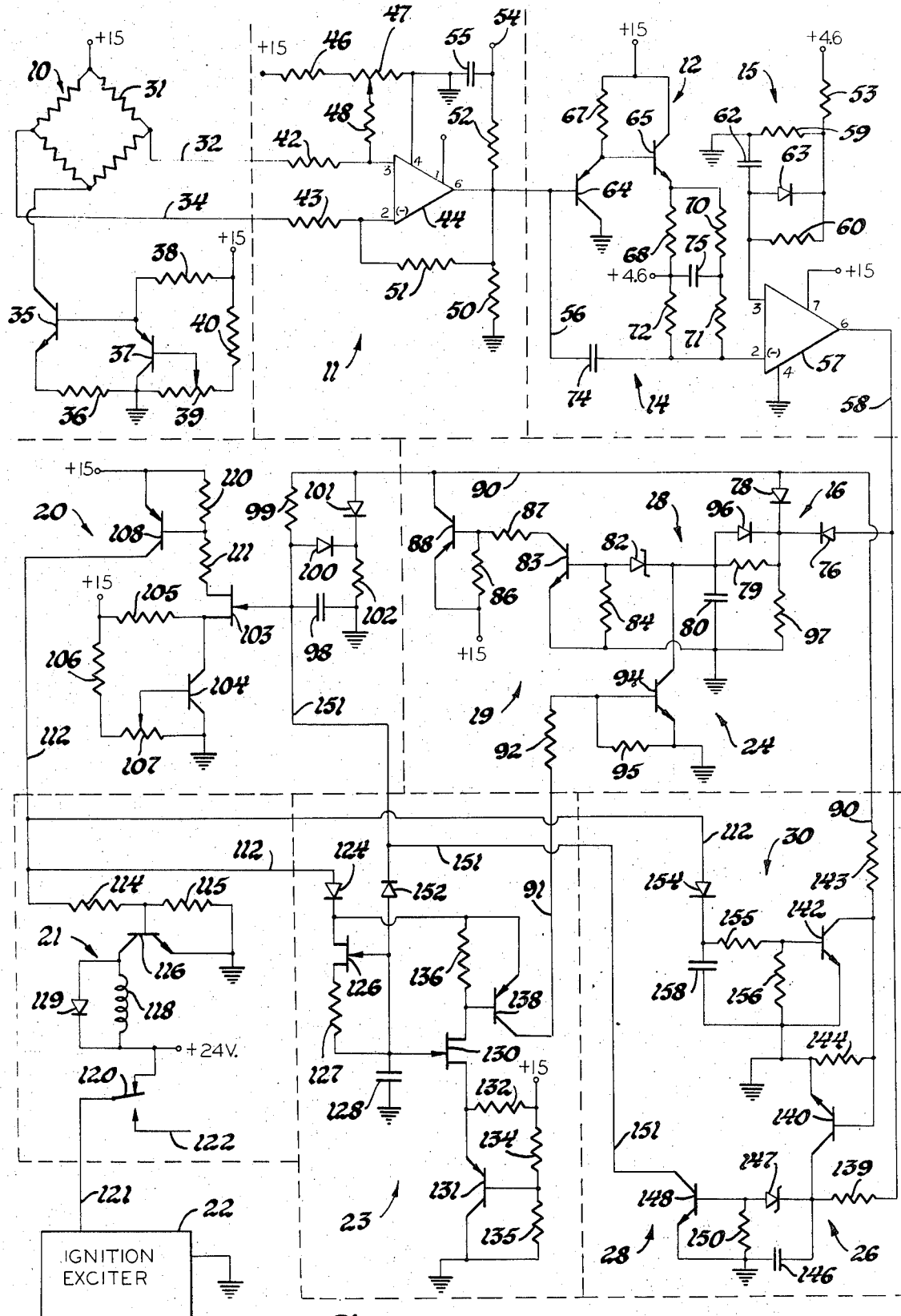
FIG. 6 is a wiring diagram of the preferred embodiment.

The specific manner in which we prefer to implement these functions is shown by the wiring diagram of FIG. 6, which also illustrates some features preferably embodied in a working system which have not been discussed in this general description of the system.

DESCRIPTION OF THE CIRCUITS

In order to disclose clearly an operative system, types or values of components of the electronic circuits will be specified. It will be understood, of course, that such values may be varied if desired and the specific values cited merely represent the presently preferred embodiment of the electronic system. In connection with this, all FET transistors are type 2N4221 UOS, all PNP transistors are type 2N2907 UOS, all NPN transistors are type 2N956 UOS, the operational amplifiers are 741 type UOS, and all diodes are type 1N914 UOS. The values of resistors, potentiometers, and capacitors are tabulated following the body of this description.

In the discussion to follow, all circuits will be traced in the direction from conventional positive to ground rather than in the electron flow sense.

The system includes a regulated power supply energized from the power buses of the aircraft which supplies accurate 15 volt positive voltage and accurate 4.6 volt positive voltage. The details of the power supply are immaterial to our invention, and since such power supplies are widely understood by those skilled in the electronic arts, it will not be described here. The legend +15 on FIG. 6 represents a 15 volt input from the power supply and the legend +4.6 indicates a 4.6 volt input from the power supply.

The pressure sensor or transducer 10 of FIG. 5 is diagramed in the upper lefthand corner of FIG. 6. The transducer includes a pressure responsive device 31. Any suitable pressure responsive device may be used, but the one presently used by us is one manufactured by Fairchild Camera and Instrument Corporation, Controls Division, 974 East Arques Avenue, Sunnyvale, Cal. 94086, sold under code identification 25677. This is a device embodying four semiconductor resistance arms connected in the Wheatstone bridge circuit and in which opposite arms are varied inversely with changes in pressure supplied to the transducer. The transducer may be connected by a suitable pressure line to some part of the engine at compressor discharge pressure, such as the air inlet to the combustion chamber.

The pressure transducer 31 is nominally excited by five milliamperes D.C. from an exciting circuit and provides an output on lines 32 and 34 of 100 millivolts for 150 psi, the voltage being proportional to pressure. The exciting circuit for the transducer 31 is from +15 volts through the bridge circuit, the collector-emitter circuit of transistor 35, and resistor 36 to ground. The base of transistor 35 and the emitter of transistor 37 are connected to +15 volts through a resistor 38. The collector of transistor 37 is grounded and its base is connected to the moving contact of a potentiometer 39, one end of which is grounded and the other end of which is connected through resistor 40 to +15 volts. The drop through resistor 40 and a portion of potentiometer 39 provides approximately a three volt potential on the base of transistor 37. This has approximately one-half volt drop emitter to base, so the emitter is maintained at 3½ volts, the fifteen volt supply being dropped through resistor 38 to this value. The same plus 3½ volts is supplied to the base of transistor 35. Since its drop from base to emitter is about one-half volt, the voltage across resistor 36 is held constant at three volts. By maintenance of this constant voltage, the current through resistor 36 is held at a constant value, so that the sensitivity of the bridge 31 remains constant. Transistors 35 and 37 provide temperature compensation for each other, since their temperature characteristics are similar. Potentiometer 39 is a means for adjusting the current flow through the bridge for calibration purposes. So far as the schematic of FIG. 5 is concerned, the current control circuit just described is considered to be part of the pressure transducer.

The next unit of the system is the operational amplifier 11 shown in the center of the upper portion of FIG. 6. The potential difference representing CDP is supplied through lines 32 and 34 and resistors 42 and 43, respectively, to the input terminals 3 and 2 of operational amplifier 44. The number 7 terminal of the amplifier is supplied by 15 volts positive and the number 4 terminal is grounded. The number 6 terminal is the output. Amplifier 44 serves to amplify the pressure signal voltage, and to isolate the transducer from the amplifier output circuit by virtue of its high input impedance. The output of the amplifier is proportional to the difference of the inputs on its terminals 3 and 2. A calibrating circuit is provided which adds a voltage to the voltage supplied through line 32 and resistor 42. This circuit, which amounts to a zero pressure setting, comprises a circuit from +15 volts to ground through resistor 46 and potentiometer 47. The tap of the potentiometer is connected through resistor 48 to terminal 3 of the operational amplifier. The potentiometer 47 thus provides a voltage additive to that on the line 32 for zero setting of the amplifier.

Output terminal 6 of the amplifier is grounded through line 56 and resistor 50. The operational amplifier feedback to the inverting input 2 is provided by resistor 51. For test or calibration purposes, the output of amplifier 44 is connected through resistor 52 to an external terminal 54 to which a measuring instrument may be connected. To filter out any noise that be present, terminal 54 is grounded through capacitor 55. As a matter of information, in the device illustrated the output voltage of amplifier 44 varies from 3.27 volts at zero psig to 9.93 volts at 100 psig.

The shaping, differentiating, and comparing circuits corresponding to elements 12, 14, and 15 in FIG. 5 are illustrated in the upper right corner of FIG. 6. As stated, these provide an output responsive to a pressure decline indicative of an engine flameout. The comparing circuit 15 comprises an operational amplifier 57 which provides an output on line 58 of substantially 15 volts in the event of flameout; otherwise, the potential on line 58 is zero.

The shaping circuit also includes circuitry to provide a fixed datum signal to the positive input 3 of amplifier 57. The output of the shaping and differentiating circuits are mixed and fed to input 2 of amplifier 57, which is triggered to energize line 58 when the potential at input 2 is driven lower than that at input 3.

The datum voltage is derived from the 4.6 volt regulated power supply by a circuit through a voltage divider comprising resistors 53 and 59 connected between this supply and ground. The resulting voltage, which is 67 millivolts below the +4.6, is supplied through impedance matching resistor 60 to the input terminal 3 of operational amplifier 57. Capacitor 62 which is connected between this terminal and ground serves to delay the application of this approximately 4 volt signal to the amplifier input for the charging time of condenser 62. The reason for this is that otherwise the system would generate a spurious flameout signal when the flameout detecting system is energized from its power supply. Diode 63 provides a quick discharge circuit for capacitor 62 through resistor 59 when the system is turned off.

The shaping and differentiating circuits 12 and 14 overlap slightly in the actual wiring as shown on FIG. 6, since they share a mixing circuit. Considering first the shaping circuit, this comprises transistors 64 and 65 and resistors 67, 68, 70, 71 and 72. The transistors 64 and 65 define a voltage follower which follows the input through line 56 to the base of transistor 64 from the amplifier 11. The +15 volt is dropped through resistor 67, which maintains the emitter of transistor 64 slightly above the potential of its base, the collector being grounded. The base of transistor 65 is connected to emitter of 64 and the collector of 65 to +15 volts. Thus the emitter of transistor 65 which discharges through resistor 68 to the +4.6 volt input tends to follow exactly the level of the input line 56 except that the potential of the emitter of transistor 65 may not drop below the 4.6 volt floor. The varying voltage corresponds to line 9 and the 4.6 volt floor to line 8 of FIG. 4. Resistors 70, 71, and 72 connected in series between the emitter of transistor 65 and the 4.6 volt fixed input form a voltage divider to scale properly the output of shaping circuit transistor 65 and mix this output with that from the Δ CDP circuit.

The output line 56 of the amplifier 11 is connected into the resistance network 70, 71, 72 through a differentiating capacitor 74. If we neglect the output of capacitor 74, the resistance network determines the potential at the inverting input 2 of operational amplifier 57 as follows: $E = 4.6 + (V_{e65} - 4.6)(R72/R70 + R71 + R72)$ Thus, the voltage at the input 2 of amplifier 57 varies proportionately with that of the emitter of transistor 65. A capacitor 75 grounding the junction between resistors 70 and 72 provides a "memory" or time lag so that fast transients do not alter the emf contributed by the transistor 64,65 network.

Capacitor 74 provides the Δ CDP signal to terminal 2 of amplifier 57. This capacitor and the equivalent resistance of the network comprising resistors 68, 70, 71, and 72 form an R-C circuit which detects a value closely following that of Δ CDP; that is, a step change in CDP indicated by a step change in the emf on line 56 will cause essentially an equal step change on input terminal 2 of amplifier 57. This step signal will then decay at the rate determined by the R-C circuit, which in this case has about a 12 millisecond time constant. The result is that a compressor discharge pressure step decay large enough to overcome the initial bias of amplifier 57 (the −67 millivolts below the 4.6 volts input) and the contribution of the shaping network will drive terminal 2 of the amplifier 57 to a lower potential than terminal 3 and cause amplifier 57 to change states from no output to full positive output, about 15 volts. Thus at this point we have an On-Off signal on line 58 which is on as the result of flameout and off otherwise.

The next block of the wiring diagram, at the right center, includes the OR circuit 16 which is a latch, the 5 msec delay circuit 18, and the AND circuit 19, 24. The flameout signal on line 58 is supplied to the OR gate 16, one element of which is a diode 76 and the other element of which is a diode 78. The signal proceeds through diode 76 and resistor 79 to charge capacitor 80, the other terminal of which is grounded. The resistor 79 and the condenser 80 are connected to Zener diode 82 which has a breakdown voltage of 6 or 8 volts. When condenser 80 is charged to this level, the Zener conducts to turn on transistor 83. Capacitor 80 provides the 5 msec delay to block ephemeral voltage surges or "noise" from initiating the reignition cycle. The Zener is connected to the base of the transistor 83 which is grounded through resistor 84. The emitter of this transistor is grounded, and its collector is connected to 15 volts through a voltage divider formed by resistors 86 and 87. The resulting voltage drop through resistor 86 communicated to the base of a transistor 88 turns on this transistor, so that current flows from the +15 volts to a line 90 constituting the output of the AND gate 19. The other input of gate 19 will be described below. This is an inverted signal from the output of the 2.8 second delay circuit 23 and, in the condition of the system presently being described, this acts as a plus input. Once transistor 88 becomes conducting, the feedback through diode 78 of the OR gate 16 maintains condenser 80 charged after the disappearance of the signal on line 58 from the comparing circuit until the gate 91 turns off. The AND gate 19 receives its second input on line 91 from the 2.8 second timing circuit 23 through resistor 92 to the base of a transistor 94 which provides the inverting function indicated as 24 in FIG. 5. Current flow through the voltage divider defined by resistor 92 and a resistor 95 turns this transistor on, thus grounding the input to Zener diode 82 and discharging capacitor 80, turning off the transistors 83 and 88. A diode 96 and resistor 97 provide a discharge circuit for capacitor 80 whenever the input signal from the OR gate 16 disappears.

The flameout signal from the logic circuits on line 90 is supplied to the 0.57 second delay circuit 20 which allows time for mechanical oscillations attendant upon flameout to subside. The delay is provided by charging of capacitor 98 connected between ground and line 90 through resistor 99. A diode 100 provides a quick discharge circuit for the condenser through a resistor 102. A diode 101 connected between line 90 and resistor 102 blocks this discharge path as long as the signal is maintained on line 90. The potential to which capacitor 98 is charged is supplied to the gate of a field effect transistor (FET) 103. The drain of this FET is maintained at eight and a half volts by a voltage regulating and temperature compensating circuit involving a transistor 104. The emitter of this transistor is connected to the drain of the FET and its collector is grounded. Its emitter is energized from 15 volts through resistor 105. The base of transistor 104 is maintained at about 8 volts by the adjustable voltage divider comprising resistor 106 and time delay adjusting potentiometer 107. With the half volt emitter-base drop, this provides the 8½ volts on the drain of the FET. This type of transistor has a pinch-off voltage of six, so the FET 103 will become conductive when the gate voltage reaches 2.5. When it conducts, it establishes an energizing circuit for a transistor 108 from the 15 volt supply through resistor 110 and 111, the former being connected from emitter to base of 108 and the second from base of 108 to the source of the FET. When transistor 108 is turned on, it energizes an output line 112 from the fifteen volt supply, this line having several branches, one of which energizes the ignition.

This is effected by the transistor and relay circuit indicated as 21 toward the lower left of FIG. 6. Potential on line 112 is conducted through series resistors 114 and 115 to ground. This energizes a transistor 116, completing a circuit from a +24 volt power supply line through an ignition relay coil 118 to ground. Relay coil 118 is shunted by a diode 119 which provides for voltage spike suppression upon deenergization of the relay. As illustrated, the relay coil 118 closes front contacts 120 which complete a circuit from the 24 volt power supply through a line 121 to the ignition exciter 22 of the engine 2. The relay may also operate an indicator circuit to show that the igniter is energized. The relay may open at a back contact 122 the circuit from the pilot's ignition switch to the exciter. If there is no further disturbance or input to the circuit, the exciter will remain energized for 2.8 seconds, after which the timing circuit 23 of FIG. 5 will turn off the exciter.

If the flameout was due to some temporary condition, as mentioned above, it is to be expected that the engine will reignite while still rotating at a speed sufficient to make it capable of self-sustaining operation and will then accelerate to normal operating speed.

The timing circuit 23, at bottom center of FIG. 6, receives an input through line 112 and an isolating diode 124 from the 0.57 delay circuit 20. This input is fed to the source of an FET 126, the drain of which is connected through a self-biasing resistor 127 to a timing capacitor 128, the other terminal of which is grounded. The gate of the FET 126 is connected between resistor 127 and capacitor 128. The resistor 127 acts to maintain constant current through FET 126 by a self-biasing effect. As will be seen, if current through the FET increases, the drop in resistor 127 will increase, raising the drain voltage level and thereby lowering the relative voltage on the gate of the FET. An automatic balance is thus maintained, holding the current through the resistor constant at a value which balances with the characteristic curve of the FET. The timing capacitor 128 thus charges linearly rather than exponentially and the charging rate is controlled accurately.

The potential stored in capacitor 128 is supplied to the gate of an FET 130 the drain of which is connected to a constant voltage circuit constituted by transistor 131 and resistors 132, 134, and 135. The emitter of the transistor is energized through resistor 132 and the collector is grounded. The base is energized by the voltage divider circuit comprising resistors 134 and 135 which maintain the base at a constant potential, about ten volts and thus the emitter at ten and a half volts dropped through resistor 132. With the pinch-off voltage of FET 130 at 6 volts, at approximately four and a half volts on the gate of this FET current will flow from line 112 through diode 124 and a resistor 136. The drop in resistor 136 biases a transistor 138 from emitter to plate of which it is connected. Current will thus flow after 2.8 seconds from line 112 through diode 124 and transistor 138 to the line 91 previously referred to, which leads through the inverting amplifier to AND gate 19. This will turn off the AND gate and thus deenergize the ignition circuits 22. It also deenergizes the latching OR gate 16.

The logic circuits which reset the timers on occurrence of a flameout signal, including a repeated flameout, identified as 26, 27, 28, and 30 in FIG. 5, are diagramed in the lower right corner of FIG. 6. These are not entirely distinct, as would appear from FIG. 5. Referring first to the AND gate 26, when the flameout signal from the operational amplifier 57 is transmitted through line 58, a circuit through a resistor 139 and transistor 140 to ground is energized. Transistor 140 will conduct if line 90 is also energized and a transistor 142 is non-conducting. Line 90 is connected to the base of transistor 140 through resistor 143 and the base is grounded through resistor 144. When transistor 140 is conducting, it discharges a capacitor 146 which normally is charged through resistor 139 when line 58 is energized upon occurrence of a flameout. When the first flameout signal energizes line 58 at 15 volts, current flowing through resistor 140 charges capacitor 146 after about a 5 millisecond delay. When capacitor 146 is sufficiently charged to cause current to flow through a Zener diode 147, a transistor 148 is biased to conduct. The emitter of this transistor is grounded and its base to which the Zener is connected is grounded through resistor 150. When transistor 148 conducts, it drains the timing capacitors 98 in the delay circuit 20 and 128 in the timing circuit 23. This grounding of the capacitors assures that the timing functions are not made inaccurate by residual charges in the capacitors. This is the "reset" of FIG. 5. The grounding is effected through a line 151 connected from the collector of transistor 148 directly to capacitor 98 and through a diode 152 to capacitor 128.

However, when the flameout signal has passed through the AND gate 19 (after the 5 msec delay in circuit 18), the positive signal on line 90 from this gate through resistors 143 and 144 biases transistor 140 to conduct, thereby discharging capacitor 146 and blocking for a time further resetting of the timing capacitors 98 and 128.

Later, after the 0.57 second time delay, delay circuit 20 energizes line 112, causing current to flow through a diode 154, which biases transistor 142 to conduction by the drop through resistors 155 and 156, extinguishing flow through transistor 140. Diode 154 is connected to the base of transistor 142 through a resistor 155 and the base is connected to the emitter and ground through a resistor 156. A capacitor 158 connected across resistors 155 and 156 provides a delay sufficient to assure deenergization of relay coil 118 and discharge of timing capacitors 98 and 128.

With transistor 142 conducting once the ignition is turned on, transistor 140 will not conduct, and, if a second flameout signal occurs during the ignition cycle, line 58 is energized, capacitor 146 is charged, and the timing capacitors are again discharged through line 151 as described above.

Thus, the initial flameout signal will reset the timers. During the 0.57 second delay, the timers cannot be reset. After this delay, with the ignition turned on, a second flameout signal normally represents reignition and a second flameout. In this event, the timers are reset so that there will not be a premature ignition during the transients after the second flameout, and the 2.8 second ignition period timer is reset to give an adequate ignition energization period.

This detailed description of the circuits and their operation is concluded here with a tabulation of values of circuit elements.

| Resistor | Kilohms | Resistor | Kilohms | Resistor | Kilohms |
|---|---|---|---|---|---|
| 36 | 0.75 | 38 | 4.7 | 40 | 6.04 |
| 42 | 10 | 43 | 10 | 46 | 10 |
| 48 | 1000 | 50 | 10 | 51 | 1000 |
| 52 | 4.7 | 53 | .0499 | 59 | 3.48 |
| 60 | 15 | 67 | 4.7 | 68 | 4.42 |
| 70 | 90.9 | 71 | 90.9 | 72 | 15 |
| 79 | 4.99 | 84 | 2 | 86 | 1 |
| 87 | 4.7 | 92 | 10 | 95 | 2.2 |
| 97 | 3 | 99 | 787 | 102 | 10 |
| 105 | 10 | 106 | 2 | 110 | 1 |
| 111 | 1 | 114 | 3.01 | 115 | 0.68 |
| 127 | 100 | 132 | 10 | 134 | 4.99 |
| 135 | 10 | 136 | 2.2 | 139 | 4.99 |
| 143 | 4.7 | 144 | 2 | 150 | 2 |
| 155 | 10 | 156 | 4.99 | | |

All potentiometers are 5,000 ohm.

| Capacitor | Microfarads | Capacitor | Microfarads |
|---|---|---|---|
| 55 | 1 | 62 | 4.7 |
| 74 | | 75 | 2.2 |
| 80 | 1 | 98 | 1 |
| 128 | 2.7 | 146 | 1 |
| 158 | 6.8 | | |

CONCLUSION

The structure, mode of operation, and advantages of a reignition system according to our invention should be clear to those skilled in the art from the foregoing.

Clearly, certain features of this embodiment may be omitted or varied as desired to suit specific situations and requirements.

The detailed description of the preferred embodiment of the invention for the purpose of explaining the principles thereof is not to be considered as limiting or restricting the invention, since many modifications may be made by the exercise of skill in the art.

We claim:

1. A system for automatically actuating the ignition means of a gas turbine engine in response to flameout of the engine, the engine having a power output shaft coupled to a mass-elastic system displaying significant angular oscillations in response to abrupt discontinuities in torque delivered by the engine, the system comprising a transducer developing a signal indicative of CDP of the engine; trigger signal generating means actuated by the transducer signal effective to discriminate between levels of rate of change of CDP as a function of CDP as an indicator of flameout of the engine; time delay means actuated by the trigger signal effective to transmit the trigger signal after a time sufficient for decay of the said angular oscillations; and means actuated by the trigger signal transmitted by the time delay means for energizing the engine ignition means.

2. A system for automatically actuating the ignition means of a gas turbine engine in response to flameout of the engine, the engine having a power output shaft coupled to a mass-elastic system displaying significant angular oscillations in response to abrupt discontinuities in torque delivered by the engine, the system comprising a transducer developing a voltage indicative of CDP of the engine; first and second signal generating means responsive to the transducer, the first signal generating means generating a signal representing rate of change of CDP, the second signal generating means generating a signal varying with CDP representing the rate of change of CDP upon flameout of the engine; a comparator responsive to the two signal generating means providing a trigger signal upon flameout; time delay means actuated by the trigger signal effective to transmit the trigger signal for a predetermined time period beginning after a time sufficient for decay of the said angular oscillations; and means actuated by the trigger signal transmitted by the time delay means for energizing the engine ignition means.

3. A system for automatically actuating the ignition means of a gas turbine engine in response to flameout of the engine, the engine having a power output shaft coupled to a mass-elastic system displaying significant angular oscillations in response to abrupt discontinuities in torque delivered by the engine, the system comprising a transducer developing a voltage indicative of CDP of the engine; first and second signal generating means responsive to the transducer, the first signal generating means generating a signal representing rate of change of CDP, the second signal generating means generating a signal varying with CDP representing the rate of change of CDP upon flameout of the engine; a comparator responsive to the two signal generating means providing a trigger signal upon flameout; time delay means actuated by the trigger signal effective to transmit the trigger signal after a time sufficient for decay of the said angular oscillations; means actuated by the trigger signal transmitted by the time delay means for energizing the engine ignition means; and timing means energized by the time delay means effective to continue transmission of the trigger signal for a predetermined time period to hold the ignition means energized.

4. A system for reigniting the combustor of a gas turbine power plant upon flameout comprising, in combination, signal generating means responsive to CDP of the power plant; shaping means for generating a second signal from the first signal discriminating a level of Δ CDP as a function of CDP indicative of flameout; derivative means responsive to the first signal for generating a third signal representative of Δ CDP; comparing means responsive to the second and third signals effective to generate a flameout signal; delay means responsive to the flameout signal effective to delay transmission of the signal during initial transients in the power plant excited by the flameout; and ignition means to reignite the combustor responsive to the output of the delay means.

5. A system for reigniting the combustor of a gas turbine power plant upon flameout comprising, in combination, signal generating means responsive to CDP of the power plant; shaping means for generating a second signal from the first signal proportional to CDP above a predetermined level of CDP for discriminating a level of $\Delta$ CDP as a function of CDP indicative of flameout; derivative means responsive to the first signal for generating a third signal representative of $\Delta$ CDP; comparing means responsive to the second and third signals effective to generate a flameout signal; delay means responsive to the flameout signal effective to delay transmission of the signal during initial transients in the power plant excited by the flameout; and ignition means to reignite the combustor responsive to the output of the delay means.

6. A system for reigniting the combustor of a gas turbine power plant upon flameout comprising, in combination, signal generating means responsive to CDP of the power plant; shaping means for generating a second signal from the first signal discriminating a level of $\Delta$ CDP as a function of CDP indicative of flameout; derivative means responsive to the first signal for generating a third signal representative of $\Delta$ CDP; means responsive to the second and third signals effective to generate a flameout signal; delay means responsive to the flameout signal effective to delay transmission of the signal during initial decay of oscillations in the power plant excited by the flameout; ignition means to reignite the combustor responsive to the output of the delay means; timing means effective to maintain the ignition means operative for a predetermined time; and logic means effective to block flameout signals during the operation of the delay means and effective to reset the delay means upon occurrence of a flameout signal during operation of the ignition means.

7. A system for reigniting the combustor of a gas turbine power plant upon flameout comprising, in combination, signal generating means responsive to CDP of the power plant; shaping means for generating a second signal from the first signal discriminating a level of $\Delta$ CDP as a function of CDP indicative of flameout; derivative means responsive to the first signal for generating a third signal representative of $\Delta$ CDP; comparing means responsive to the second and third signals effective to generate a flameout signal; momentary delay means energized by the flameout signal effective to screen out ephermeal spurious flameout signals, first logic means responsive to the output of the momentary delay means; second delay means responsive to the output of the first logic means effective to delay transmission of the signal during initial decay of oscillations in the power plant excited by the flameout; ignition means to reignite the combustor responsive to the output of the delay means; timing means effective to maintain the ignition means operative for a predetermined time; and second logic means effective to block flameout signals during the operation of the delay means and effective to reset the delay means upon occurrence of a flameout signal during operation of the ignition means.

8. A system for reigniting the combustor of a gas turbine power plant upon flameout comprising, in combination, signal generating means responsive to CDP of the power plant; shaping means for generating a second signal from the first signal discriminating a level of $\Delta$ CDP as a function of CDP indicative of flameout; derivative means responsive to the first signal for generating a third signal representative of $\Delta$ CDP; comparing means responsive to the second and third signals effective to generate a flameout signal; momentary delay means energized by the flameout signal effective to screen out ephemeral spurious flameout signals; first logic means responsive to the output of the momentary delay means effective to hold the flameout signal; second delay means responsive to the output of the first logic means effective to delay transmission of the signal during initial decay of oscillations in the power plant excited by the flameout; ignition means to reignite the combustor responsive to the output of the delay means; timing means effective to maintain the ignition means operative for a predetermined time and to release the first logic means upon expiration of the predetermined time; and second logic means effective to block flameout signals during the operation of the delay means and effective to reset the delay means upon occurrence of a flameout signal during operation of the ignition means.

9. A system for reigniting the combustor of a gas turbine power plant upon flameout comprising, in combination, signal generating means responsive to CDP of the power plant; shaping means for generating a second signal from the first signal discriminating a level of $\Delta$ CDP as a function of CDP indicative of flameout; derivative means responsive to the first signal for generating a third signal representative of $\Delta$ CDP; comparing means responsive to the second and third signals effective to generate a flameout signal; and ignition means effective to reignite the combustor responsive to the flameout signal.

10. A system for reigniting the combustor of a gas turbine power plant upon flameout comprising, in combination, signal generating means responsive to CDP of the power plant; shaping means for generating a second signal from the first signal discriminating a level of $\Delta$ CDP as a function of CDP indicative of flameout; derivative means responsive to the first signal for generating a third signal representative of $\Delta$ CDP; comparing means responsive to the second and third signals effective to generate a flameout signal; ignition means effective to reignite the combustor responsive to the flameout signal; timing means effective to maintain the ignition means operative for a predetermined time; and means effective to reset the timing means and reenergize the ignition means after a predetermined delay upon occurrence of a flameout signal during operation of the ignition means.

* * * * *

PO-1050
(5/69)

UNITED STATES PATENT OFFICE
CERTIFICATE OF CORRECTION

Patent No. 3,765,176        Dated October 16, 1973

Inventor(s) Robert E. Nelson and Oran A. Watts, III

It is certified that error appears in the above-identified patent and that said Letters Patent are hereby corrected as shown below:

Column 11, line 42, under "Microfarads" opposite numeral 74, insert numeral -- 1 --.

Column 13, line 24, before "means" insert -- comparing --.

Signed and sealed this 24th day of September 1974.

(SEAL)
Attest:

McCOY M. GIBSON JR.
Attesting Officer

C. MARSHALL DANN
Commissioner of Patents